United States Patent
Kirche

[15] 3,667,332
[45] June 6, 1972

[54] APPARATUS FOR STACKING FABRIC FOR PATTERN CUTTING

[72] Inventor: Robert M. Kirche, 411 West Arbor Vitae, Inglewood, Calif. 90301

[22] Filed: Apr. 19, 1971

[21] Appl. No.: 135,058

[52] U.S. Cl. ............................83/424, 83/29, 83/436, 83/517, 83/649, 83/925 CC, 226/91, 226/189
[51] Int. Cl. .........................B65h 17/00, B65h 45/101
[58] Field of Search.................83/424, 29, 436, 517, 649, 83/925 CC; 226/91, 92, 189

[56] References Cited

UNITED STATES PATENTS 3,496,815  2/1970  Ruhl.........................................83/29
3,598,006  8/1971  Gerber et al..........................83/29 X Primary Examiner—Frank T. Yost
Attorney—Gerald L. Price

[57] ABSTRACT

Apparatus for simultaneously providing a multiplicity of similarly sized pieces of sheet material in a stacked relationship in preparation for a multiple piece cutting operation employed in the garment and piece good industry. A movable carriage and clamping arrangement withdraws in one pass, a plurality of overlying lengths of sheet material from a single supply roll or bolt of material. Further provision is made to individually sever the overlying lengths after the withdrawal takes place.

13 Claims, 4 Drawing Figures

PATENTED JUN 6 1972 3,667,332
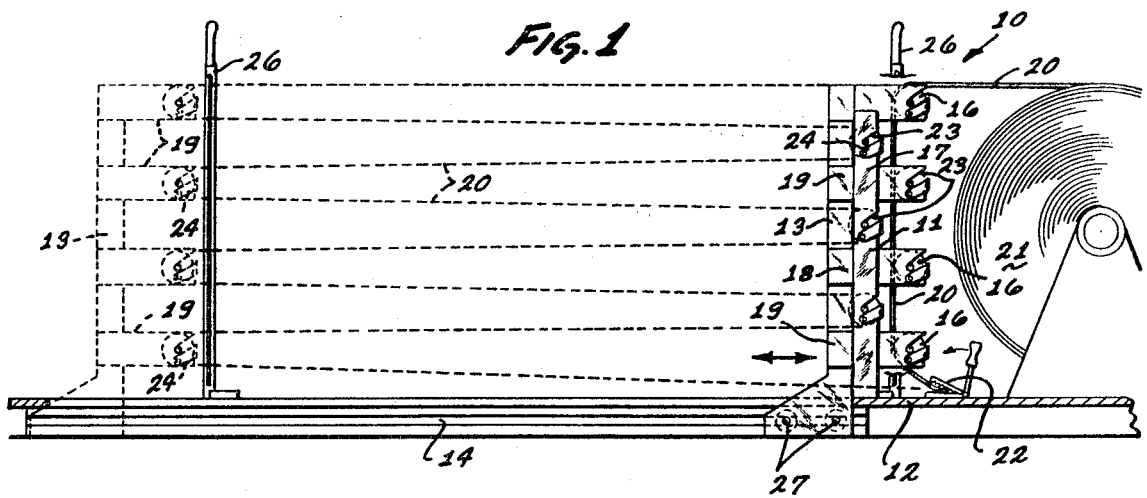
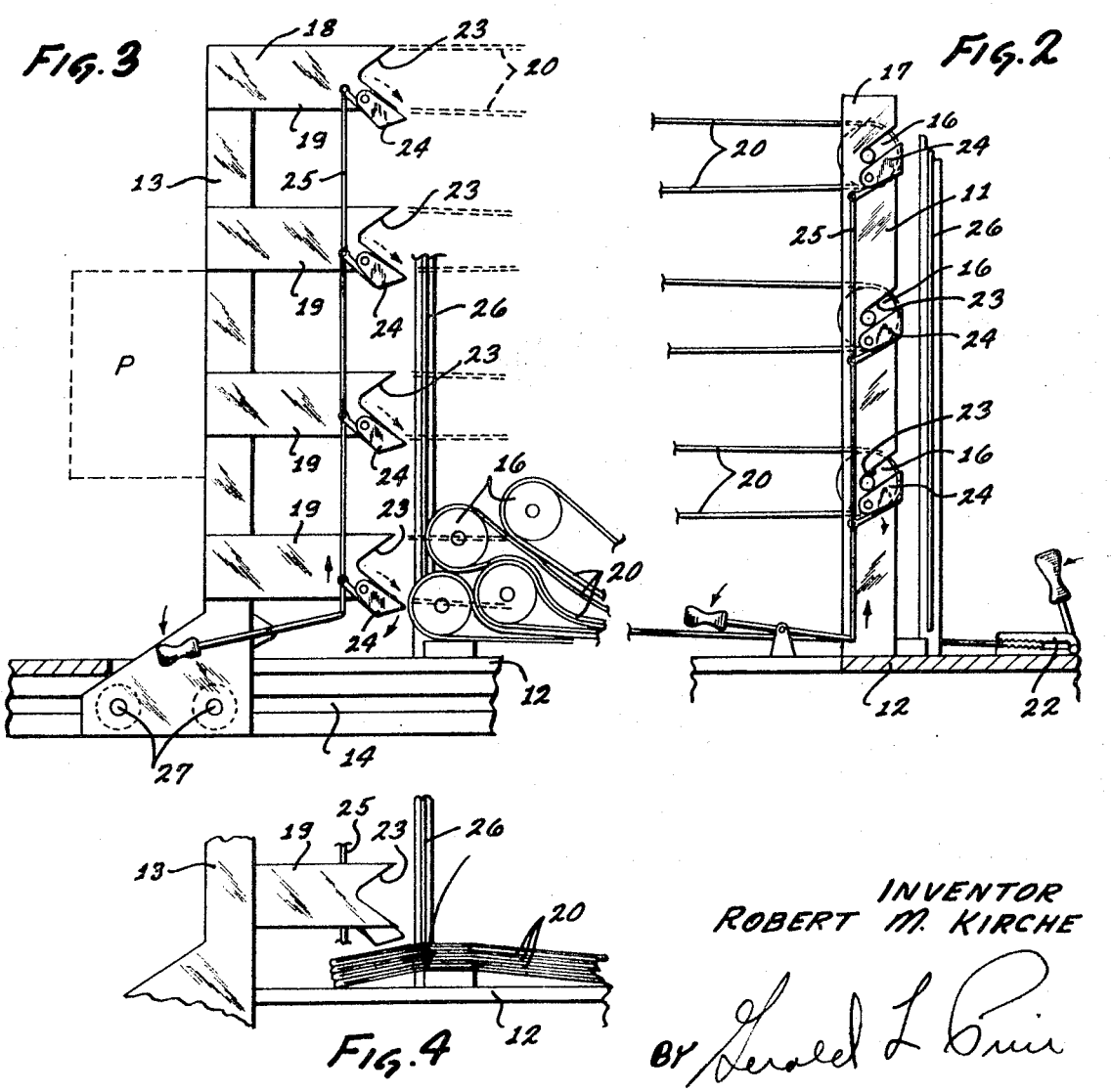
INVENTOR
ROBERT M. KIRCHE
BY *Gerald L. Price*
ATTORNEY

APPARATUS FOR STACKING FABRIC FOR PATTERN CUTTING

BACKGROUND OF THE INVENTION

The present invention relates generally to the stacking of sheet material preparatory to a subsequent operation of simultaneously cutting the stack of material into one or more predetermined patterns.

In many manufacturing industries such as, for example, the garment manufacturing industry, fabric originally supplied on rolls or bolts is unrolled and stacked many layers high on a cutting table so that a single cutting operation through the stack, will yield a large number of substantially identical pieces for utilization in a production run of a garment or the like.

In preparing the stack of material for cutting, the usual practice is for the cutter to successively unroll or unfold a given number of identical lengths of material from a roll or bolt of fabric and stack same on a cutting table so that upon the application or transfer of a pattern to the top layer of the stacked material, the entire stack can be simultaneously cut to yield as stated, a large number of identically shaped pieces of fabric for utilization in a complete product.

Similar procedures are also employed in upholstery and drapery manufacturing operations wherein it is desired to simultaneously cut a large number of identically sized pieces of fabric or flexible sheet material of the type that is supplied by the manufacturer of same on a roll or bolt.

Even though the procedure of simultaneously cutting a large stack of sheet fabric or material results in a considerable savings in time as compared with separately cutting individual sheets, the operation or procedure in unrolling or unfolding the roll or bolt of material and successively cutting a large number of identical lengths therefrom and stacking same, results in a considerable expenditure of set up time and often involves tying up the time and labor of a highly paid, skilled cutter.

SUMMARY OF THE INVENTION:

Accordingly, it is the general aim of the present invention to provide a new and improved apparatus for unrolling fabric from a supply roll, stacking same, and cutting each layer in the stack to an identical length all in a manner whereby substantial reductions in both time and labor result.

It is another object of the invention to provide apparatus for accomplishing said unrolling, stacking and cutting that can be readily operated by a single individual even in the case of extremely wide lengths of fabric.

It is another object of the invention to provide a relatively low cost apparatus for mechanically unrolling, stacking and cutting fabric or other flexible sheet material that can be readily installed on existing cutting tables.

BRIEF DESCRIPTION OF THE DRAWINGS:

Other objects and advantages of the present invention, along with the interrelationship between the elements of the preferred embodiment, will become more apparent when considered in connection with the specification and accompanying drawings in which:

FIG. 1 is a side elevation of an exemplary unrolling, stacking and cutting apparatus depicting the apparatus in its extended position in broken lines;

FIG. 2 is a side elevation of the stationary roller fixture used with the present invention;

FIG. 3 is a side elevation of the moveable roller fixture used with the present invention; and FIG. 4 is a fragmentary side elevational view depicting the stack of fabric in position to be cut into a plurality of layers of equal lengths.

While the present invention is susceptible of various modifications and alternative constructions and can be used with numerous types of flexible sheet material for many purposes, illustrative embodiments are shown in the drawings and will herein be described in detail. It should be understood, however, that it is not intended to limit the invention to the particular forms disclosed, but, on the contrary, the intention is to cover all equivalents and alternative constructions falling within the spirit and scope of the invention as expressed in the appended claims.

DESCRIPTION OF THE PREFERRED EMBODIMENT:

Referring now to FIG. 1, an exemplary unrolling, stacking and cutting apparatus for flexible sheet material, generally indicated at 10, is illustrated, the apparatus including a stationary roller carrying fixture 11 mounted on a conventional cutting table 12 and a moveable roller fixture 13 slideably moveable along the length of the cutting table 12 on a guide channel 14 at each side edge of the cutting table. As here shown, each roller fixture 11 and 13 carry a plurality of rollers 16 freely rotatable between each pair of standards 17 and 18 of the respective roller fixtures 11 and 13.

In accordance with one of the important aspects of the present invention, provision is made for unrolling a plurality of identical lengths of material from a supply roll or bolt of same, and stacking these identical lengths of material in an overlying relationship. This is accomplished by advancing the moveable roller fixture 13 to the position depicted in FIG. 1 wherein the rollers thereon extend through the rollers on the stationary roller fixture 11 so that they are disposed on the opposite side thereof. It will be observed that the rollers 16 on the moveable roller fixture 13 are outwardly disposed from the vertical portion of the upright 18 by horizontal extension arms 19 which are part of the upright and attached thereto. It is also pointed out while not specifically shown, that the rollers on the moveable fixture 13 are narrower than the rollers on the stationary fixture 11 in order that the apparatus will function as heretofore described. When the rollers 16 on the moveable fixture are extended through the rollers 16 on the stationary fixture as depicted in FIG. 1, material 20 can be unrolled from the supply roll 21, inserted between the two vertical arrangements of rollers 16 on the respective uprights 17 and 18, and the extreme end of said material can then be secured to the cutting table 12 by a clamp provided therefor. In FIGS. 1 and 2, an exemplary clamp 22 is depicted affixed to the cutting table between the supply roll 21 of material 20 and the stationary roller fixture 11, for this purpose.

In order to accomplish the unrolling and stacking of a plurality of identical lengths of the material 20, the moveable roller fixture 13 is then repositioned by advancing it down the cutting table 12 to the position depicted in broken lines in FIG. 1. At this position which corresponds to the desired length of the individual pieces of material 20, there will have been withdrawn material from the roll 21 so as to bridge the distance between each successive roller of each respective roller fixture as depicted in broken lines in FIG. 1.

In order to accomplish the stacking of the material, provision is made for releasing the rollers 16 from their respective roller fixtures 11 and 13 so that all the rollers on each respective fixture can be lowered thereby bringing the unwound lengths of material 20 together in a stacked relationship as depicted in FIG. 3.

In order to accomplish the release of each roller 16 from the uprights 17 and 18 (FIGS. 2 and 3), each respective roller 16 is maintained in its respective slot 23 by a pivotable plate 24 provided at each slot 23 so as to normally provide slot 23 in an upwardly opening direction as seen in FIG. 2 which serves to maintain each respective roller 16 in place. By pivoting each plate 24 downwardly as depicted in FIG. 3, the slot 23 by virtue of its exposed bottom downward opening, permits each respective roller 16 to be removed therefrom.

To facilitate the pivoting of each plate 24, each upright 17 and 18 is provided with a manually actuated linkage arrangement 25 which can simultaneously pivot each plate 24 on the respective roller fixture.

In order to provide each length of material 20 that has been stacked in an identical length, a cutter 26 is provided immediately adjacent each roller fixture 11 and 13 preferably as close to the uprights and lowered roller 16 as possible, so that when the cutter is actuated, it will cut all lengths of material 20 extending between the two roller fixtures 11 and 13 to a substantially identical length and also result in a minimum of scrap or wasted material.

Accordingly, it will be readily appreciated by those skilled in the art that the instant apparatus will enable a single individual to rapidly unroll, stack and cut a plurality of identical lengths of material so as to provide the stack of material for subsequent simultaneous cutting from some desired pattern or the like.

While the moveable roller fixture 13 is depicted as being manually moveable along the guide channels 14 by a pair of rollers 27 (FIGS. 1), the present invention also contemplates driving the movable roller carriage 13 by power means indicated at P in FIG. 3, which would be highly desireable when dealing with a large number of separate sheets of material being unrolled. While not shown, any number of well known conventional methods could be used to drive the moveable roller carriage by power means such as, for example, a chain drive disposed beneath the cutting table 12.

Furthermore, it has been found that in certain situations it is desireable to provide the higher rollers in a larger diameter than the lower rollers due to relative movement and resistance and accordingly, the provision of same while not illustrated would be well within the province of one skilled in the art. Further contemplated, especially in connection with the situation of long pulls of many lengths of heavy material, would be to drive the rollers 16, and the supply roll 21 with an externally applied power drive all at suitable relative rates commensurate with the rate of movement of fixture 13 along the cutting table. In this situation, it has been found that a textured or gripping surface on the rollers 16 is desireable. In furtherance of this aim, in many situations the power driven unwinding of the supply roll 21 is desireable either alone or in conjunction with the power driving of the rollers 16.

While not depicted in the drawings, it is further contemplated to provide the instant invention in an embodiment whereby the supply roll 21 is carried on the moveable fixture 13 along with the clamp 22. In this embodiment, the power unit P can be provided to move the roller fixture 13, rotate the rollers thereon, and unwind the supply roll 21, all at selected relative rates to insure smooth and trouble free operation that will not stretch or injure the material 20.

In further keeping with the object and intent of the present invention, it is also contemplated that each corresponding pair of slots 23 of moveable fixture 13 are also adapted to receive a clamping fixture (not shown) of the same general type as clamp 22 instead of a roller 16. Accordingly, this provision will enable the instant embodiment to be capable of simultaneously withdrawing a plurality of overlying lengths of material from one or a plurality of supply rolls or bolts. This feature is particularly advantageous in large production runs and where different patterns or types of material are to be simultaneously cut into the same pattern.

It is also deemed desireable to have the cutter 26 associated with moveable roller fixture 13 moveably mounted with the roller fixture since this would enable any desired length material to be unrolled, stacked and cut with the instant apparatus. It should also be pointed out that while the instant apparatus utilizes a cutter 26 of the single blade guillotine type, there are many alternative cutters well known in the instant art including most recently laser beams, that could be utilized with the present invention without departing from the spirit and scope thereof.

WHAT IS CLAIMED IS:

1. Apparatus for simultaneously providing a plurality of overlying segments of flexible sheet material from a continuous supply source comprising:
   a. a first set of spaced elongated separation means;
   b. a second set of spaced elongated separation means selectively moveable from a first position generally proximate said first set of separation means to a selected second position generally remote from said first set of separation means, the distance between said second set of separation means and said first set of separation means when said second set of separation means is in said selected second position being substantially equivalent to that of the selected length of each segment of the sheet material;
   c. each said first and second set of separation means being disposed with respect to itself and the other whereby when said second set of separation means is in said first position, the forward end of the sheet material can be alternately interwoven between respective separation means in each said first and second sets whereby upon securing the forward portion of the sheet material to the apparatus after the sheet material has been interwoven between said respective separation means in each said first and second sets, the said movement of said second set of separation means to said second position will simultaneously withdraw a plurality of segments of sheet material from the continuous supply source, the segments being in a generally stacked overlying relationship to each other and each segment being substantially the same length; and
   d. means for securing the forward portion of the sheet material to said apparatus whereby the movement of said second set of separation means to said second position will withdraw the plurality of segments of sheet material from the continuous supply source.

2. The apparatus as set forth in claim 1 wherein at least a portion of said separation means in at least one said set thereof are rotatable.

3. The apparatus as set forth in claim 1 wherein each said first and second set of spaced elongated separation means comprises a plurality of rollers in a substantially vertical alignment on a frame means, each said roller having a length at least that of the flexible sheet material.

4. The apparatus as set forth in claim 1 wherein said means for securing the forward end of the sheet material is disposed relatively stationary to the movement of said second set of separation means.

5. The apparatus as set forth in claim 1 wherein the continuous supply of sheet material and said means for securing the forward portion of same are both carried by and moveable with said second set of separation means.

6. The apparatus as set forth in claim 1 further including means for severing the plurality of segments of sheet material into individual lengths, said means for severing proximate to at least one of said sets of separation means.

7. The apparatus as set forth in claim 1 wherein at least a portion of said separating means in at least one of said sets thereof can be selectively replaced with means for securing a forward portion of the sheet material thereto.

8. The apparatus as set forth in claim 1 further including means for releasing said separating means from their respective location in each said set thereof whereby each said set of separating means can be selectively brought substantially together from the said spaced relationship thereof.

9. The apparatus as set forth in claim 2 further including means for power driving said rotatable separating means.

10. The apparatus as set forth in claim 1 further including power driven means for withdrawing the continuous supply source of flexible sheet material during said movement of said second set of separation means from said first position to said second position thereof.

11. The apparatus as set forth in claim 5 wherein at least a portion of said separation means in said second set thereof are rotatable.

12. The apparatus as set forth in claim 11 wherein said rotatable separation means is power driven.

13. The apparatus as set forth in claim 5 further including means for power driving the withdrawal of the continuous supply source of flexible sheet material during said movement of said second set of separation means from said first position to said second position thereof.

* * * * *